United States Patent [19]
Oxel

[11] 3,850,331
[45] Nov. 26, 1974

[54] BROILER LID FOR FRYPANS AND THE LIKE

[75] Inventor: Berton R. Oxel, Louisville, Ohio

[73] Assignee: The Hoover Company, North Canton, Ohio

[22] Filed: Apr. 13, 1973

[21] Appl. No.: 350,681

[52] U.S. Cl............... 220/335, 99/340, 219/403, 219/454, 220/69, 220/85 CH, 248/175, 220/379
[51] Int. Cl............................................. B65d 7/42
[58] Field of Search .......... 220/85 CH, 85 H, 85 R, 220/30; 219/398, 454, 405, 403, 386, 436; 248/401, 94, 175, 176; 99/340, 425

[56] References Cited
UNITED STATES PATENTS

| 1,928,995 | 10/1933 | De Biasi | 220/85 CH |
| 2,168,604 | 8/1939 | Lee | 219/405 X |
| 2,342,692 | 2/1944 | Rehm | 219/393 |
| 2,664,490 | 12/1953 | Allgeyer | 220/85 CH |
| 3,088,393 | 5/1963 | Huckahee | 99/340 |
| 3,635,371 | 1/1972 | Oxel | 220/85 CH |

Primary Examiner—Billy S. Taylor

[57] ABSTRACT

A lid for use with an open top vessel and normally adapted to rest upon said vessel in top-closing relation. A leg is carried by the lid and may depend therefrom, the lower end of the leg being bifurcated to closely straddle a side wall of the vessel to support the lid in spaced relation above the vessel and generally in registry with the vessel open top. The leg is pivoted to the lid to permit the leg to be shifted to one side for non-interference with disposition of the lid on the vessel in its normal, top-closing position.

7 Claims, 9 Drawing Figures

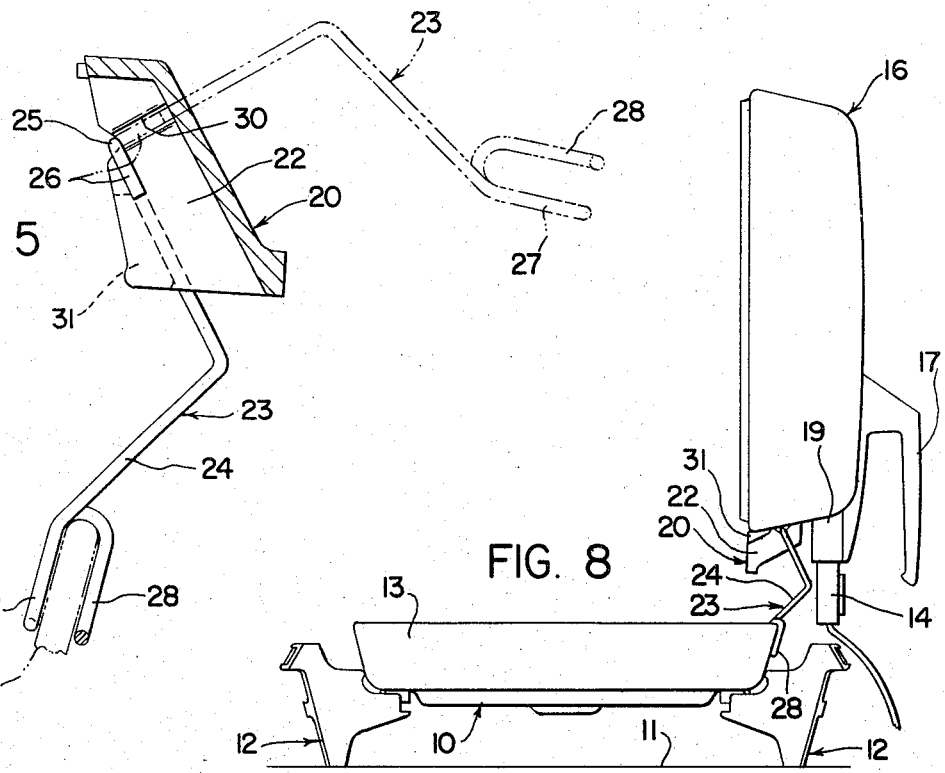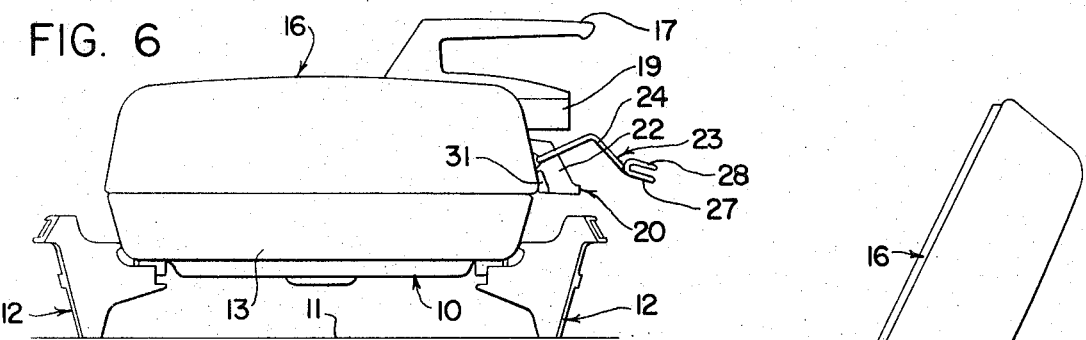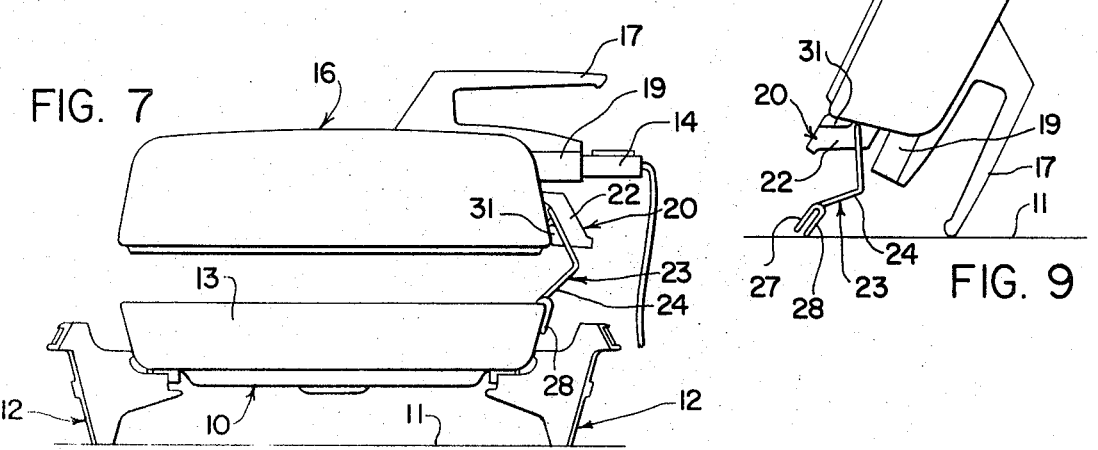

BROILER LID FOR FRYPANS AND THE LIKE

BACKGROUND AND SUMMARY OF THE INVENTION

The present invention relates to lids for open top vessels, more particularly to lids which contain a radiant heater and may thus be used not only as a closure for the associated vessel but also as a broiler for food contained in the vessel, and the principal object of the invention is to provide new and improved lids of the character described.

It has long been recognized that the utility of a vessel such as an electric frypan can be increased by mounting an electric resistance radiant heater in its lid. There is thus provided not only a covered pan for frying, stewing, roasting or baking, but by use of the lid with the radiant heating element, the pan may be used for broiling.

In prior art frypans with broiler lids, the lid, when used for broiling, rested upon the pan in covering relation in the same manner as when the pan was used for stewing or baking. This is undesirable since cooking vapors and heat trapped within the pan tends to produce a baking rather than broiling effect upon foods.

The present invention provides means by which the lid may be supported directly above the pan during broiling so that a true broiling effect is obtained. Nevertheless, such means does not interfere with disposition of the lid on the pan in pan-covering relation when the pan is to be used for cooking rather than broiling.

The foregoing is accomplished by the novel expedient of providing a depending leg on the lid which straddles a side wall of the pan to support the lid directly above but in spaced parallel relation with the pan. Sufficient space between the lower rim of the lid and the upper rim of the pan is provided to insure escape of vapors and heat to achieve true broiling. The leg is, moreover, pivoted to the lid to permit the leg to be shifted to position where it will not interfere with normal disposition of the lid on the pan in pan-covering relation.

These and other advantages will readily become apparent from a study of the following description and from the drawings appended hereto and, in the drawings accompanying this specification and forming a part of this application, there is shown, for purpose of illustration, an embodiment which the invention may assume, and in these drawings:

DRAWING DESCRIPTION

FIG. 1 is a side elevational view, with parts on the near side broken away to show the underlying structure, of a lid of the present invention in use in broiling position on an electric frypan, FIG. 2 is an elevational view generally corresponding to the line 2—2 of FIG. 1, FIG. 3 is a bottom plan view generally corresponding to the line 3—3 of FIG. 1, FIG. 4 is an enlarged, fragmentary, elevational view with certain parts omitted in the interest of clarity, FIG. 5 is a fragmentary, sectional view generally corresponding to the line 5—5 of FIG. 4, FIG. 6 is a reduced size elevational view of the lid supported on the frypan in covering relation with the latter, FIG. 7 is a view similar to FIG. 6 but with the lid supported on the frypan in spaced relation thereabove, FIG. 8 is a view similar to FIG. 7 but with the lid in an alternate position, and FIG. 9 is a side elevational view of the lid standing in generally upright relation on a countertop or other supporting surface.

DETAILED DESCRIPTION

Figure 1:
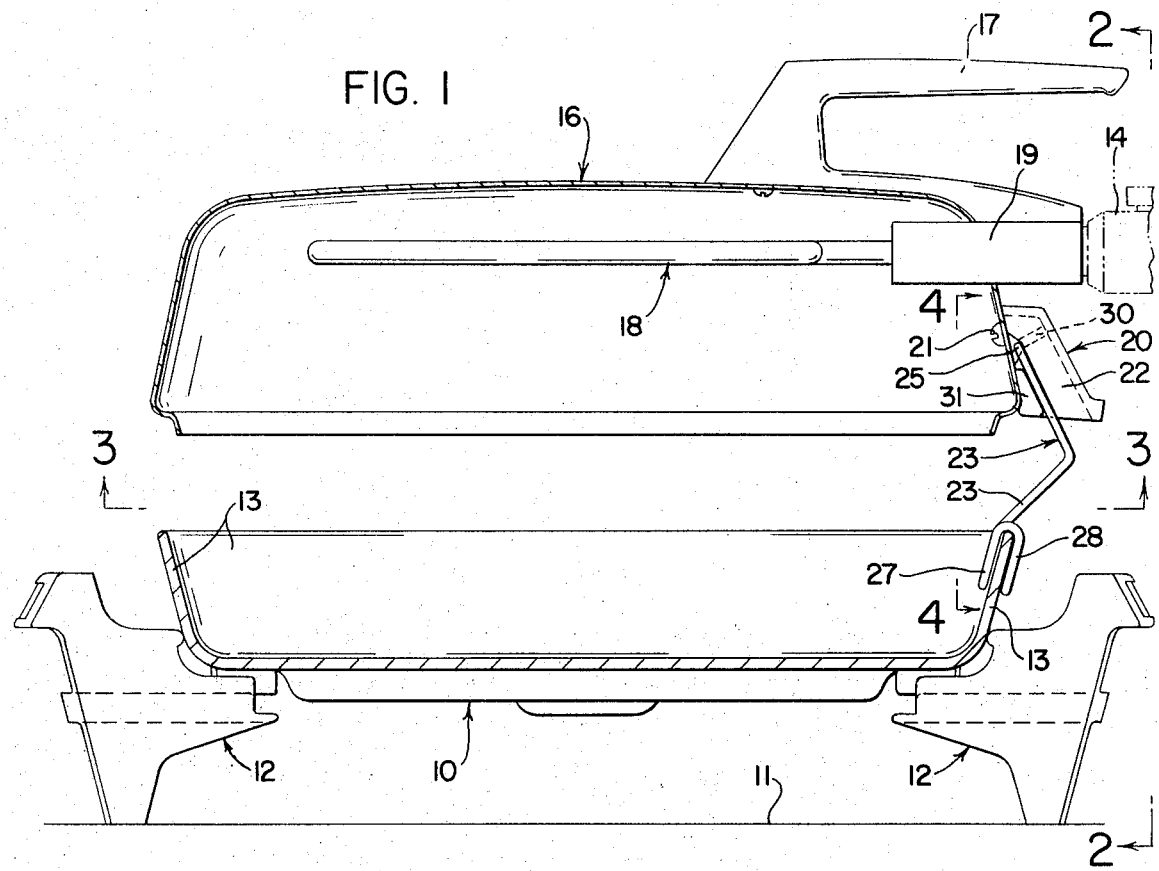

As seen in FIGS. 1, 2, 6, 7 and 8, the reference character 10 represents a vessel such as an electric frypan of any conventional design. As herein disclosed, such frypan is generally square (but with rounded corners) and is supported on an underlying supporting surface, such as a countertop 11, by means of a pair of opposed, buffet-type, handle-leg assemblies 12. The pan has slightly outwardly inclined, upstanding side walls 13 and, in the absence of the about-to-be-described lid, constitutes an open top vessel. While it forms no part of the invention, the pan 10 may be conventionally provided with a brazed-on, cast-in or otherwise associated electric heating element (not shown) to which electrical connections may be made by the usual controller 14 removably connectable to suitable terminals 15. The controller 14, of course, is at one end of a power cord which is connectable to a suitable outlet which provides a source of electrical energy.

A rather deep lid 16 is conventionally provided for use with the vessel 10 and, as seen in FIG. 6, is normally disposed to rest upon and close the open top of the vessel during many cooking operations. For ease of manipulation, the lid is usually provided with a suitable handle 17.

Figure 3:
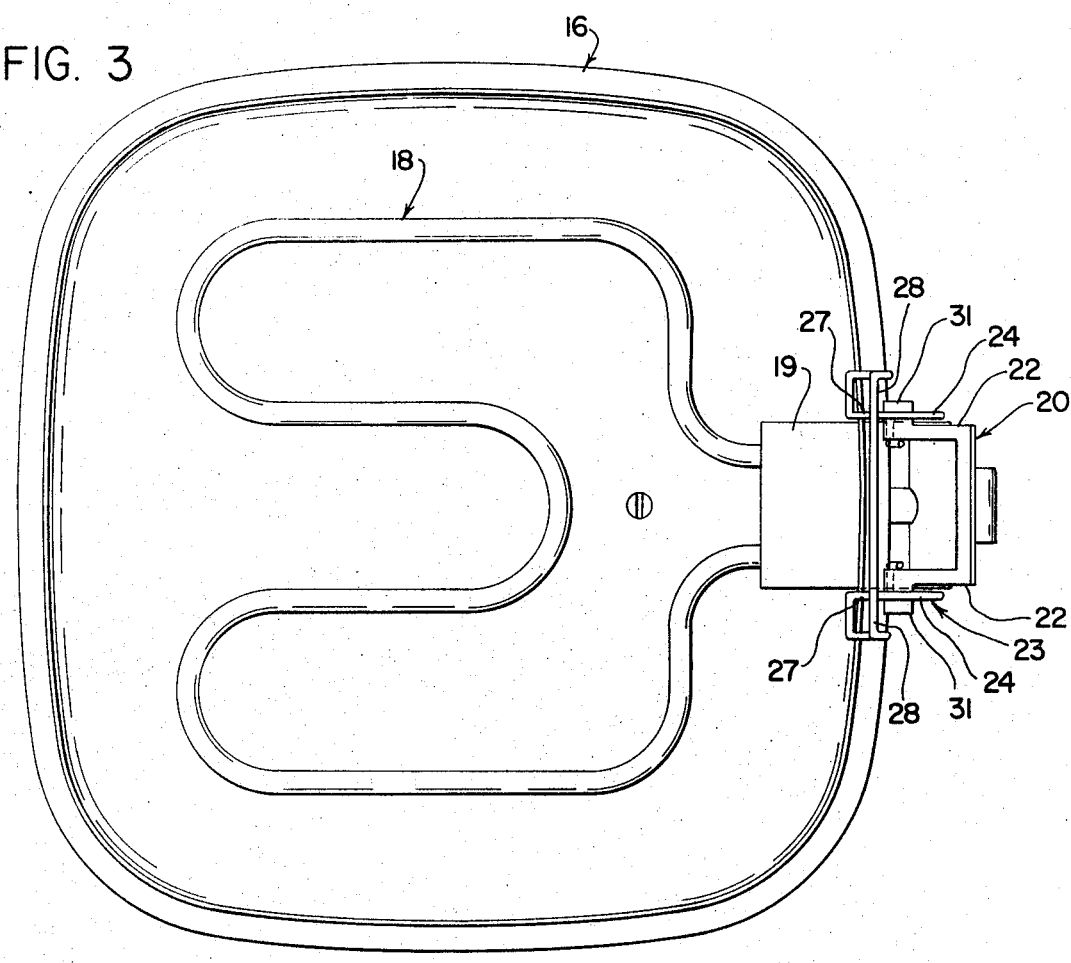

When a more versatile cooking appliance is desired, it has been common practice to removably mount a metal sheathed electric resistance heating element 18 (see FIGS. 1 and 3) within the lid 16. In a conventional manner which forms no part of the present invention, the terminal ends of the element 18 may be removably received within a sleeve 19 carried by the lid, such sleeve being adapted to receive the previously mentioned controller 14, with the latter making electrical connection with the terminal ends of the element 18, when the lid-mounted element 18 is to be used for broiling or the like.

When the lid-mounted element 18 is to be used for broiling, it has been common practice to place the food to be broiled within the pan 10, to then place the lid on the pan as seen in FIG. 6, and to then connect the controller to the lid-mounted element as hereinabove described, for purpose of energizing the element. With the lid thus resting upon the pan in covering relation, however, best results are not obtained because cooking vapors and heat are trapped beneath the lid. Accordingly, even if a vent is provided in the lid, it is difficult to broil without, to a certain extent, baking as well.

Figure 2:
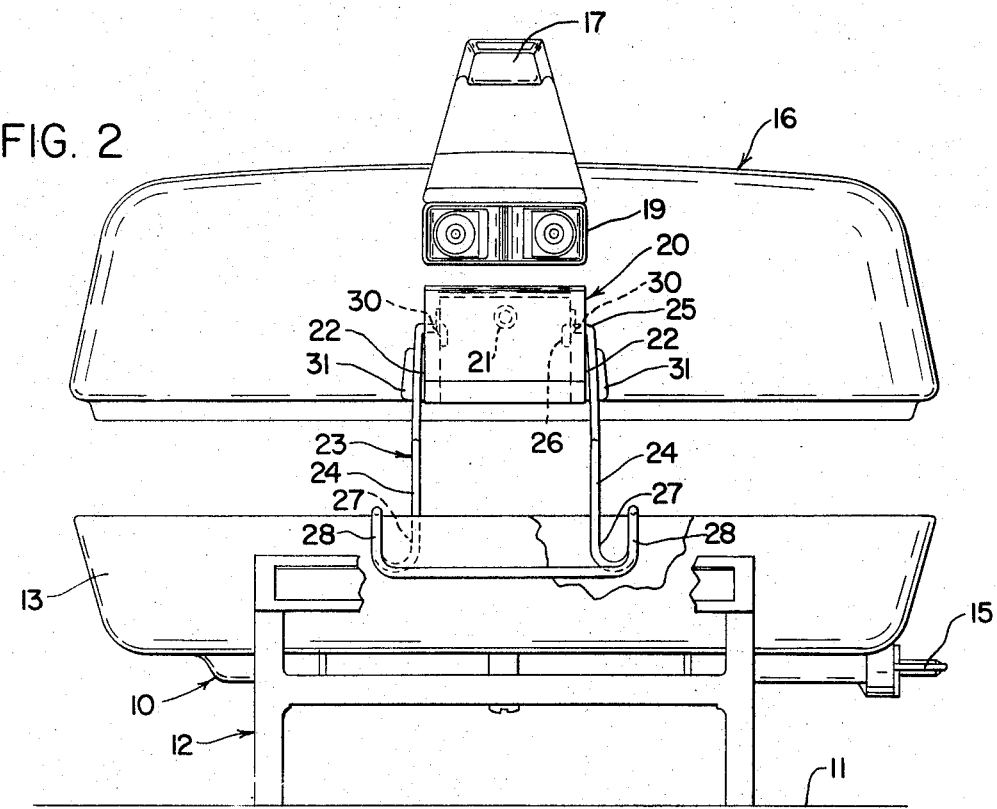

To provide for broiling without appreciable baking, the present invention contemplates supporting the lid horizontally on the pan and in registry with its open top but spaced slightly above the pan as best seen in FIGS. 1, 2 and 7. This permits radiant heat emitted by the lid-mounted element 18 to be directed downwardly into the pan to broil food disposed therein while at the same time the vertical spacing between the lid and the pan permits cooking vapors and heat to escape thereby resulting in a true broiling operation.

As best seen in FIGS. 1 through 5, a molded body 20 of phenolic material is suitable secured, as by means of one or more screws 21, to the exterior of the lid side wall adjacent the handle 17 and beneath the latter and the sleeve 19. The body 20 is recessed to provide opposed side walls 22 for a purpose to appear. An elongated support leg 23 is carried by the body 20 and is herein disclosed as being formed of resilient wire. Such support leg is generally U-shaped as viewed in FIG. 4 and opposed side portions 24 thereof terminate in short transverse axle portions 25 whose free ends 26 are doubled back on the side portions 24. The bight portion of the leg 23 is formed to provide a pair of furcations 27, 28 adjacent each side portion 24 which are spaced to closely straddle a side wall 13 of the frypan as seen in FIGS. 1 and 5.

Figure 4:
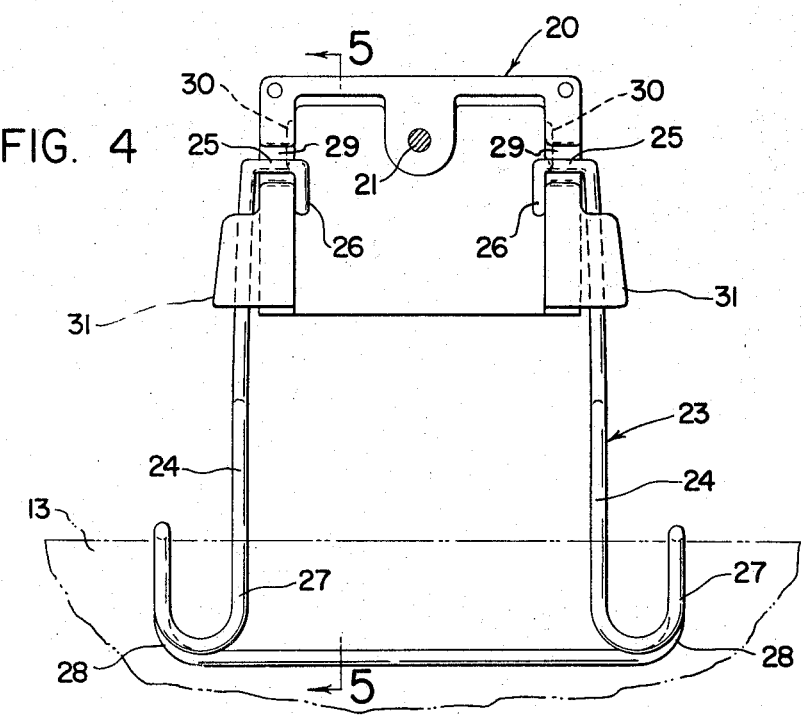

As best seen in FIGS. 4 and 5, body 20 has aligned openings 29 formed in opposed side walls 22 adjacent the lid, the axle portions 25 of the leg 23 passing through and being trapped in such openings by the adjacent wall of the lid. Leg portions 25 are thus journaled in the body with the ends 26 disposed within the body recess and bearing against respective adjacent body side walls 22. For a purpose to appear, pockets 30 are formed in respective body side walls 22 for closely receiving respective leg portions 26.

With reference to FIGS. 1 and 2, the side walls 22 of body 20 are each provided with a laterally projecting abutment 31 adjacent the lower part of the body. Such abutments engage respective side portions 24 of the leg 23 at a place intermediate the upper and lower leg ends for a purpose to appear.

When the lid 16 is to be used for broiling, the leg 23 will be positioned as seen in FIGS. 1 through 5 and 7. The food to be broiled will be placed in the pan and the leg 23 so positioned on the pan that its furcations 27, 28 are centered upon and straddle the pan wall 13. The controller 14 may then be plugged into the sleeve 19 to operably engage the terminal ends of the lid heating element 18 and, with the cord inserted into a suitable electrical outlet, the element may be energized to generate radiant heat for broiling. It is to be noted that engagement between the leg portions 24 and respective abutments 31 so limits relative rotation of the lid and the leg as to support the lid in spaced, horizontal relation directly above the pan as best illustrated in FIGS. 1 and 2.

Momentary access to the interior of the pan is readily provided by tilting the lid about the leg axle portions 25 from the horizontal position seen in FIG. 7 to the vertical position seen in FIG. 8. With the lid so positioned, see also the phantom line position of the leg 23 as seen in FIG. 5, the end portions 26 will spring into respective body pockets 30 to yieldably retain the lid in this position.

If the leg 23 is disengaged from the pan when the lid and the leg are positioned as seen in FIG. 8 and in phantom lines in FIG. 5, the lid may be supported on the countertop 11 by use of the leg 23 and the handle 17 as seen in FIG. 9. This same position of the lid and the leg provides for disposition of the lid on the pan in covering relation therewith, as seen in FIG. 6, without interference from the leg.

In view of the foregoing, it will be apparent to those skilled in the art that I have accomplished at least the principal object of my invention and it will also be apparent to those skilled in the art that the embodiment herein described may be variously changed and modified without departing from the spirit of the invention, and that the invention is capable of uses and has advantages not herein specifically described, hence it will be appreciated that the hereindisclosed embodiment is illustrative only and that my invention is not limited thereto.

I claim:

1. For use with an open top vessel adapted to be supported on a generally underlying surface and having upstanding side walls, the improved combination comprising, a lid having a lower portion cooperable with said vessel for selective support of said lid on said vessel in top-closing relation therewith, and support means carried by said lid for selective support of the latter in an elevated position vertically spaced above said vessel, said support means including a leg having a pivot connection with said lid and said leg having a portion spaced from said pivot connection which is bifurcated to closely straddle said vessel upstanding side wall, means cooperable with said leg providing a predetermined support position about said pivot connection in which said lid and leg are so inter-related that with said leg straddling said vessel side wall, said lid will be supported on said pan by said leg with said lid in registry with said vessel open top but in spaced relation above and generally parallel with said vessel, said pivot connection of said leg with said lid providing for movement of said leg from its support position aforesaid to provide for disposition of said lid on said vessel in top-closing relation therewith without interference from said leg.

2. The construction of claim 1 wherein said pivot connection provides for shifting of said lid relative to said leg to provide for support of said lid on said vessel by said leg in position wherein said lid is generally perpendicular to said vessel.

3. The construction of claim 1 wherein said leg is elongated, and wherein the end of said leg opposite its bifurcated end has said pivot connection with said lid.

4. The construction of claim 3 wherein the cooperable means aforesaid includes abutment means carried by said lid and engageable with said leg intermediate its ends to limit movement of said leg in one direction about said pivot connection beyond said predetermined leg support position.

5. The construction of claim 4 wherein said lid includes a body rigidly secured thereto, wherein said pivot connection is provided at said body, and wherein said abutment means is provided by said body.

6. The construction of claim 5 wherein said leg has a pair of coextensive portions in spaced, side-by-side relation, wherein said leg portions are disposed on opposite sides of said body, and wherein said body has lateral projections on opposite sides thereof which engage respective leg portions and constitute said abutment means.

7. The construction of claim 6 wherein at least one of said leg coextensive portions has a part disposed in a recess in said body, and wherein said part is resiliently receivable in a pocket formed in said body to yieldably retain said leg in position spaced from its support position aforesaid.

* * * * *